United States Patent Office 2,722,530
Patented Nov. 1, 1955

2,722,530
POLYANTHRIMIDE VAT DYESTUFFS

Paul Sutter, Binningen, Switzerland, assignor to Ciba Limited, Basel, Switzerland No Drawing. Application November 24, 1952, Serial No. 322,341

Claims priority, application Switzerland November 30, 1951

5 Claims. (Cl. 260—277)

This invention provides anthraquinone vat dyestuffs which, like the anthrimide of the formula (1) 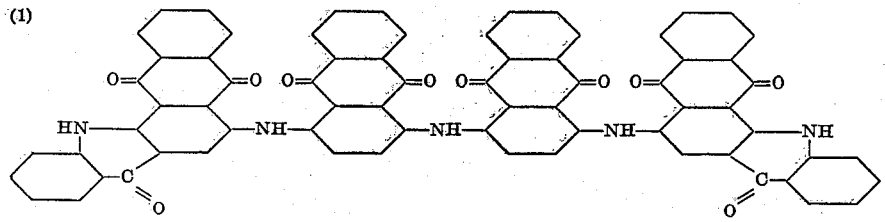

or like the products obtainable therefrom by reaction with a carbazolizing agent, correspond to the general formula (2) 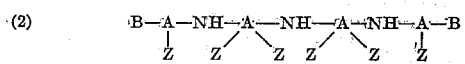

in which the symbols A represent anthraquinone nuclei bound in α-position to the —NH— groups and bound to one another by the —NH— groups exclusively in the 1:4-positions, which anthraquinone nuclei are bound to the symbols Z in β-positions vicinal to the said α-positions, the symbols B represent non-vattable aryl-acridone radicals fused on to the anthraquinone nuclei in α-position through the —NH— group and in the β-position through the —CO— group, and the radicals

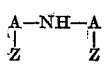

represent atomic groupings of one of the two formulae

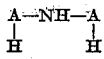

and

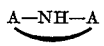

The new dyestuffs are made in accordance with the invention by reacting an anthraquinone derivative of the formula (3) 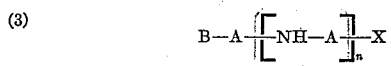

with an anthraquinone derivative of the formula (4) 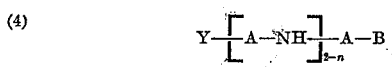

in the molecular ratio 1:1, or by reacting an anthraquinone derivative of the formula (5)        B—A—X with an anthraquinone derivative of the formula (6)        Y—A—NH—A—Y in the molecular ratio 2:1, in which formulae one of the symbols X and Y represents a halogen atom and the other an —NH₂ group, A represents anthraquinone radicals which are bound exclusively in α-position to the halogen atoms, —NH and —NH₂ groups and the radicals A not bound directly to B contain the halogen atoms, —NH and —NH₂ groups exclusively in 1:4-positions, B represent non-vattable aryl-acridone radicals fused on to the anthraquinone nuclei in α-position through the —NH— group and in β-position through the —CO— group, and $n$ represents a positive whole number not greater than 2, and, if desired, treating the product so obtained with a carbazolizing agent.

The dyestuffs of the Formula 2 contain a total of four anthraquinone nuclei, all of which are connected together through —NH— groups (anthrimide bridges) in 1:4-positions and of which the two end nuclei also contain a non-vattable aryl-acridone radical fused on in 5(N):6-, or 8(N):7- or advantageously in 4(N):3-position, and therefore correspond to the formula (7) 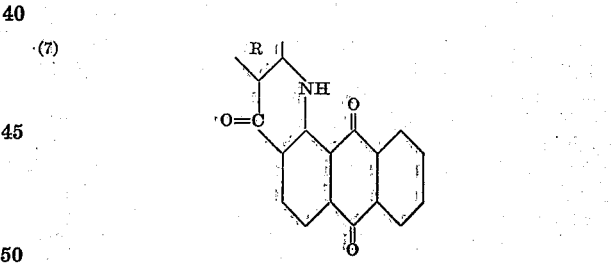

in which R represents a non-vattable aryl radical fused on to the acridone ring in the manner described above. The radical R may, for example, be a naphthalene radical (naphthacridones) or especially a benzene radical (benzacridones), for example, a naphthalene or benzene radical free from further substituents or containing one or two halogen atoms, for example, chlorine atoms as substituents. Besides halogen atoms there come into consideration as substituents for example, alkyl-sulfone groups such as methyl-sulfone groups, alkoxy groups, phenoxy groups and sulfonic acid amide groups such as the sulfonic acid dimethyl amide group.

The anthraquinone nuclei may, if desired, contain, in addition to the substituents essential for the above definition, further substituents of the kind usual in vat dyestuffs, for example, halogen atoms. On account of their more ready accessibility there are of special interest starting materials of the above Formulae 3 to 6 in which the anthraquinone nuclei are free from substituents other than those required by the formulae.

From the foregoing description it will be understood that the tetranthrimides are obtained by condensing a halogen-compound of the formula (8) 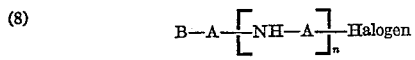

with an amino compound of the formula (9) 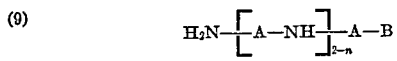

or by condensing an amino compound of the formula

(10) 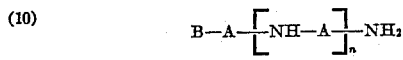

with a halogen compound of the formula

(11) 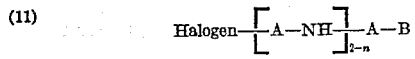

or by condensing two molecular proportions of a halogen-compound of the formula

(12)  B—A—Halogen with 1 molecular proportion of a diamine of the formula

(13)  H₂N—A—NH—A—NH₂ or by condensing 2 molecular proportions of a monamine of the formula

(14)  B—A—NH₂ with 1 molecular proportion of a dihalogen compound of the formula

(15)  Halogen—A—NH—A—Halogen

The compounds of the Formulae 8 to 15 used as starting materials, of which some are already known, can be made by methods in themselves known. Among the known starting matreials there may be mentioned, for example, 4-, 5- or 8-aminoanthraquinone-2:1(N)-1':2' (N)-benzacridone, 4-, 5- or 8-halogen-anthraquinone-2:1(N)-1'2'(N) - benzacridones, 4:4'-dibromo-1:1-dianthrimide and 4:4'-diamino-1:1'-dianthrimide.

Further compounds of the above Formulae 8 to 11 containing two or three anthraquinone radicals can be synthesized from simple starting materials. The amino-di-anthrimides can be made, for example, by condensing an α-halogen-anthraquinone-2:1(N)-acridone with 1-amino-4-nitro-anthraquinone, followed by reduction of the nitro group to an amino group. By further condensations with 1-halogen-4-nitroanthraquinones and subsequent reduction amino-trianthrimides can be made from the resulting di-anthrimides.

Furthermore, the corresponding halogen anthrimides can be made from the amino-anthrimides so obtainable by diazotization followed by reaction with a cuprous halide.

The reactions of α-aminoanthraquinone compounds with α-halogenanthraquinone compounds necessary for making the polyanthrimides of the Formula 2 in the present process and in part also for making the starting materials by the methods described above, may be carried out in a high boiling solvent which does not react with the starting materials, for example, in naphthalene or nitrobenzene, advantageously in the presence of a catalyst known to promote the formation of anthrimides such as copper or copper salts, and if desired with the addition of an acid binding agent.

As carbazolizing agents which may be used for treating the polyanthrimides of the invention there come into consideration, for example, titanium tetrachloride and especially aluminum chloride. The reaction can be carried out in a manner in itself known in the presence of a suitable solvent or diluent or fluxing agent, for example, in the presence of a tertiary base such as quinoline, or pyridine, or nitrobenzene, with the aid of a known addition product of sulfur dioxide and aluminum chloride. In some cases it is especially advantageous to carry out the carbazolization with a mixture of aluminum chloride and sodium chloride or with aluminum chloride in a commercial mixture of β:γ picoline. Good results are usually obtained by carrying out the carbazolization at a relatively high temperature, for example, at 160–180° C., which is easily possible with the two carbazolizing agents last mentioned.

Depending on the choice of the carbazolizing agent and the reaction temperature certain differences in the properties of the products obtained, for example, with regard to the tints of the vat dyeings, can be produced.

In view of the differences in the properties of the dyestuffs before and after carbazolization it may be supposed that in the usual carbazolization treatments mentioned above at least one half of the theoretically possible carbazole ring closures occurs, and the above described differences in the properties of the end products are no doubt due in the main to the fact that the carbazolization proceeds more completely or less completely depending on the reaction conditions. When energetic conditions are used, for example, at temperatures over 160° C. (see above) for a sufficiently long period the carbazolization may be regarded as practically complete.

The carbazolization mixture may be worked up in the usual manner, for example, by pouring it on to ice and filtering. As a rule it is desirable to subject the resulting products to after-oxidation, for example, with sodium bichromate.

The new products of the invention, which correspond to the general Formula 2, especially the carbazoles, are valuable dyestuffs. They can be used as pigment dyestuffs and also for dyeing or printing a very wide variety of fibers such as wool, silk, but especially vegetable fibers such as cotton, linen, and artificial silk and staple fibers of regenerated cellulose. If desired, they can be used in the form of their leuco-ester salts produced in known manner for dyeing or printing by methods known for this class of dyestuffs. The resulting dyeings and prints are distinguished by their good fastness to light and also their good general properties or fastness.

The following examples illustrate the invention, the parts and percentages being by weight unless otherwise stated and the relationship of parts by weight to parts by volume being the same as that of the kilogram to the liter.

*Example 1*

3 parts of 4:4'-dibromo-1:1'-dianthrimide of the formula

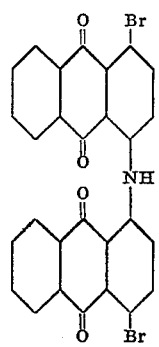

(prepared from 4:4'-diamino-1:1'-dianthrimide by diazotization followed by the Sandmeyer reaction), 3.5 parts of 4-amino-2:1(N)-1':2'(N)-anthraquinone-benzacridone, 1 part of anhydrous sodium acetate and 0.4 part of anhydrous cupric acetate are heated in 360 parts of nitrobenzene for 7 hours at the boil. After cooling the product is separated by filtering with suction, washed with nitrobenzene and then with alcohol, extracted at the boil with dilute hydrochloric acid, and dried. There is obtained in good yield in the form of a powder the anthrimide of the formula

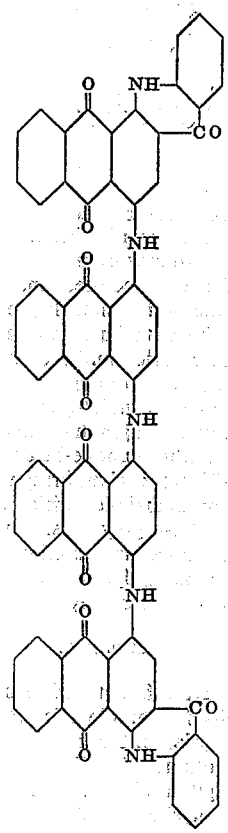

which dyes cotton from a hydrosulfite vat grey tints.

1 part of this anthrimide is introduced into a melt of 30 parts of anhydrous aluminum chloride and 6 parts of sodium chloride. The mixture is heated for one hour at 160-165° C., and is then poured on to ice and filtered. The filter residue is washed and suspended in highly diluted sulfuric acid. After the addition of 0.3 part of sodium bichromate, the mixture is stirred for 5–6 hours at room temperature, then filtered again, and the filter residue is thoroughly washed with water. The resulting dyestuff may be used in the form of a powder or paste. It may be assumed that the carbazolization has been practically complete, and therefore the dyestuff corresponds to the formula

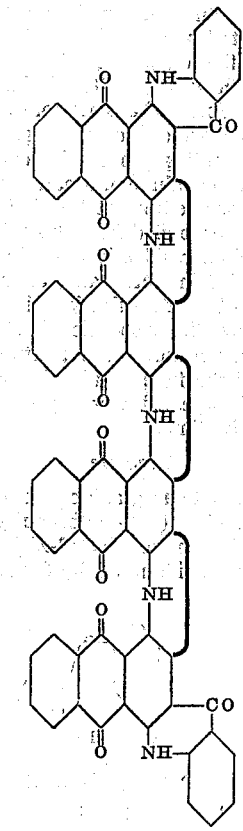

It dyes cotton from a yellow-brown vat powerful fast olive tints, which are especially fast to water drops and are of good level character. The dyestuff is also well suited for textile printing.

*Example 2*

1 part of the anthrimide obtained as described in the first paragraph of Example 1 is heated in a melt of 30 parts of anhydrous aluminum chloride and 20 parts of a commercial mixture of β- and γ-picoline for one hour at 160-165° C. The mixture is poured on to ice, filtered, and the filter residue is washed with water and suspended in highly dilute sulfuric acid. After the addition of 0.3 part of sodium bichromate the mixture is stirred for 5–6 hours at room temperature, then filtered, and the filter residue is thoroughly washed with water. The dyestuff so obtained may be used in the form of powder or paste. Like the dyestuff described in the second paragraph of Example 1, it dyes cotton from a yellow-brown vat strong, fast olive tints which are specially fast to water drops and have a good level character. The product is also well suited for textile printing.

*Example 3*

2 parts of 4:4'-dibromo-1:1'-dianthrimide, 2.7 parts of 4 - amino - 1(N) - 2 - 1':2'(N) - anthraquinone-naphthacridone of the formula

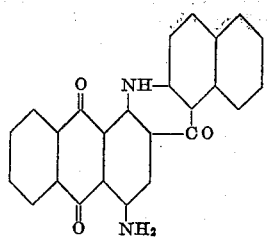

0.8 part of anhydrous potassium acetate, 0.3 part of anhydrous cupric acetate and 240 parts of nitrobenzene are heated at the boil for 14 hours. After cooling, the mixture is filtered with suction, the filter residue is washed with nitrobenzene and then with alcohol, extracted at the boil with dilute hydrochloric acid in order to remove impurities, again filtered with suction and the filter residue is washed with water. After drying the anthrimide is obtained in the form of a dark colored powder which dyes cotton from a violet-brown vat greenish grey tints.

1 part of the resulting product is heated in a melt of 30 parts of anhydrous aluminum chloride and 6 parts of sodium chloride for one hour at 160–165° C. The whole is poured on to water, boiled for a short time, filtered with suction, and the filter residue is washed with water. The residue is suspended in water, and, after the addition of a small amount of dilute sulfuric acid and 0.3 part of sodium bichromate, the suspension is stirred for several hours at room temperature. The mixture is then filtered with suction, and the filter residue is washed and dried. There is obtained a dyestuff which dyes cotton from a red-brown vat grey-olive tints.

*Example 4*

By using in the first paragraph of Example 3, instead of 4 - amino - 1(N):2-1':2'(N) - anthraquinone - naphthacridone, 3 parts of 4-amino-1(N):2-2'(N):1'-3'-phenoxy-anthraquinone-benzacridone of the formula

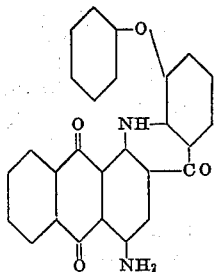

there is also obtained a dark colored anthrimide which dyes cotton grey tints from a brown vat.

1 part of this anthrimide is heated in a melt of 30 parts of anhydrous aluminum chloride and 20 parts of a commercial mixture of β- and γ-picoline for one hour at 160–165° C. The product is worked up in the manner described in Example 3. There is obtained a dyestuff which dyes cotton from a red-brown vat green-grey tints.

*Example 5*

2.5 parts of 4:4'-dibromo-1:1'-dianthrimide, 3.2 parts of 5'-chloro - 4 - amino-1(N):2-2'(N):1'-anthraquinone-benzacridone, 0.8 part of sodium acetate, 0.3 part of cupric acetate and 300 parts of nitrobenzene are heated for 7 hours at the boil. After cooling the mixture is filtered with suction, and the filter residue is washed with nitrobenzene and then with alcohol and purified in the usual manner. The anthrimide is obtained in the form of a dark colored powder which dyes cotton from a violet-brown vat grey tints.

1 part of the anthrimide is heated in a melt of 30 parts of aluminum chloride and 6 parts of sodium chloride for one hour at 160–165° C. The product is then after-treated with sodium bichromate in the manner described in Example 4. The resulting dyestuff dyes cotton from a brown vat green-olive tints.

By using instead of 5'-chloro-4-amino-1(N):2-2'(N):1'-anthraquinone-benzacridone, the corresponding quantity of 3':5'-dichloro-4-amino-1(N):2-2'(N):1'-anthraquinone-benzacridone there is also obtained a dark colored anthrimide, which dyes cotton from a violet-brown vat bluish grey tints. By subjecting the anthrimide to carbazolization in the same manner, there is obtained a dyestuff which dyes cotton from a brown vat grey-olive tints.

*Example 6*

3 parts of 4:4'-dibromo-1:1'-dianthrimide, 3.5 parts of 8-amino-1(N):2-2'(N):1'-anthraquinone benzacridone of the formula

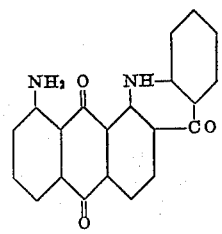

1 part of anhydrous sodium acetate, 0.4 part of cupric acetate and 360 parts of nitrobenzene are heated for 7 hours at the boil. After working up in the usual manner, there is obtained a dark colored anthrimide which dyes cotton from a violet vat violettish grey tints.

By subjecting the anthrimide to carbazolization in a melt of aluminum chloride and a commercial mixture of β- and γ-picoline, there is obtained a dyetsuff which dyes cotton from a brown vat violet-grey tints.

By using in the first paragraph of this Example 5-amino-1(N):2-2'(N):1'-anthraquinone-benzacridone, instead of 8-amino-1(N):2-2'(N) : 1'-anthraquinone-benzacridone, there is obtained an anthrimide which dyes cotton from a violet-brown vat reddish grey tints. By carbazolizing this anthrimide in the manner indicated in the foregoing paragraph there is obtained a dyestuff which dyes cotton from an olive-brown vat reddish grey tints.

*Example 7*

1 part of the dyestuff obtainable as described in the second paragraph of Example 1 is vatted in 150 parts of water with the addition of 3 parts of sodium hydrosulphite and 6 parts by volume of sodium hydroxide solution of 30 per cent. strength at about 50° C. The resulting stock vat is added to a dyebath of 2000 parts of water, which contains 4 parts of sodium hydroxide solution of 30 per cent. strength and 2 parts of sodium hydrosulfite, 100 parts of cotton are entered at 40° C., and after ¼ hour 20 parts of sodium chloride are added, and dyeing is carried on for one hour while slowly raising the temperature of the bath to 50° C. The cotton is then squeezed, oxidized in the air, rinsed in the cold, acidified, again rinsed and finally soaped at the boil for ½ hour. The cotton is dyed olive and the dyeing is distinguished by its good properties of fastness.

What is claimed is:

1. An anthraquinone vat dyestuff of the formula

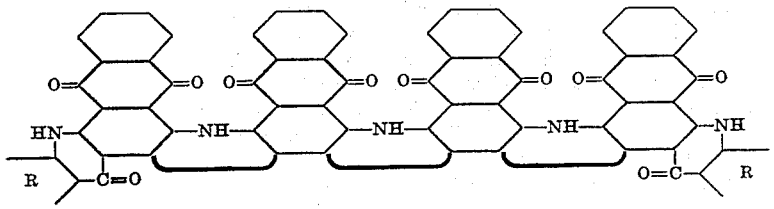

wherein the two R's are identical and each R represents a radical selected from the group consisting of the radicals corresponding to the formulae

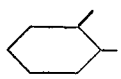

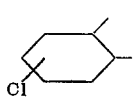

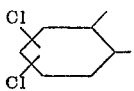

and

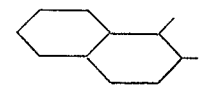

2. The anthraquinone vat dyestuff of the formula

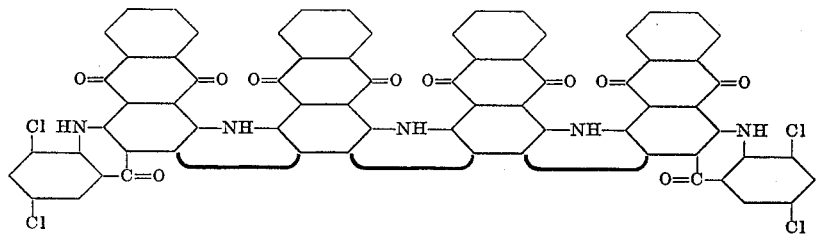

3. The anthraquinone vat dyestuff of the formula

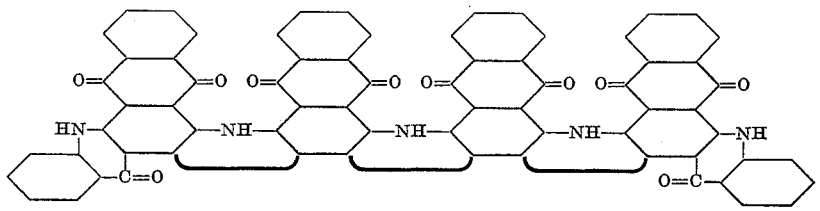

4. The anthraquinone vat dyestuff of the formula

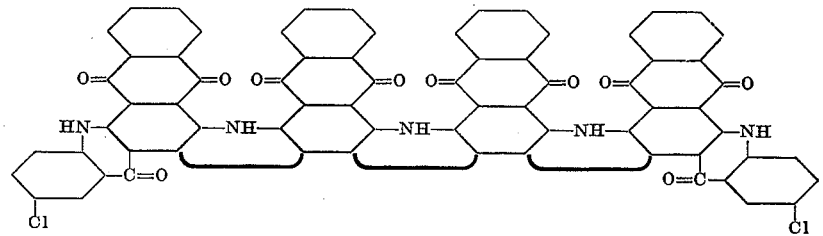

5. The anthraquinone vat dyestuff of the formula

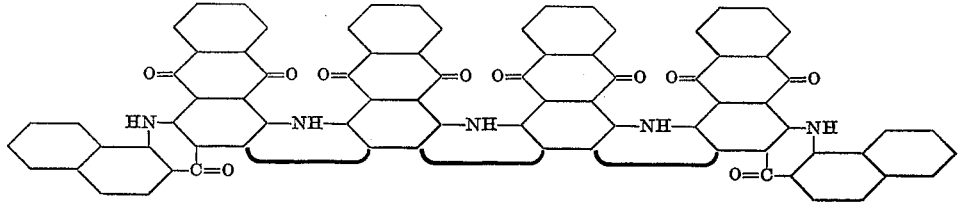

References Cited in the file of this patent
UNITED STATES PATENTS

| | | |
|---|---|---|
| 1,969,210 | Dettwyler | Aug. 7, 1934 |
| 2,036,663 | Weiland | Apr. 7, 1936 |
| 2,212,965 | Weiners | Aug. 27, 1940 |
| 2,315,537 | Miller | Apr. 6, 1943 |